(12) United States Patent
Park et al.

(10) Patent No.: US 6,200,497 B1
(45) Date of Patent: Mar. 13, 2001

(54) LOW-VOLTAGE EXCITED PINK PHOSPHOR

(75) Inventors: Sung-Kyoo Park, Pusan-si; Hyung-Keun Park, Kyungsangnam-do, both of (KR)

(73) Assignee: Samsung Display Devices Co. Ltd., Kyungki-do (KR)

( * ) Notice: Subject to any disclaimer, the term of this patent is extended or adjusted under 35 U.S.C. 154(b) by 0 days.

(21) Appl. No.: 09/414,022

(22) Filed: Oct. 7, 1999

(30) Foreign Application Priority Data

May 11, 1999 (KR) .................................................. 99 16814

(51) Int. Cl.$^7$ ..................................................... C07K 11/54
(52) U.S. Cl. ......................................................... 252/301.65
(58) Field of Search ........................................ 252/301.65

Primary Examiner—C. Melissa Koslow
(74) Attorney, Agent, or Firm—Christie, Parker & Hale, LLP

(57) ABSTRACT

A low-voltage excited pink phosphor is provided. The pink phosphor includes a ZnS:Zn or ZnS:Ag phosphor and a $(Zn_nCd_{1-n})S:Ag,Cl$ phosphor (n=0.1 to 0.5) and has good color purity, high brightness and excellent color maintenance.

7 Claims, 4 Drawing Sheets

LOW-VOLTAGE EXCITED PINK PHOSPHOR

CROSS REFERENCE TO RELATED APPLICATION

This application is based on application No. 99-16814 filed in the Korea Industrial Property Office on May 11, 1999, the content of which is incorporated herein by reference.

FIELD OF THE INVENTION

The present invention relates to a low-voltage excited pink phosphor, and more particularly, to a low-voltage excited pink phosphor of high brightness and excellent color maintenance.

BACKGROUND OF THE INVENTION

Low-voltage driven display devices utilizing a voltage of 1 kV or less to excite phosphor material include FEDs (field emission displays), VFDs (vacuum fluorescent displays), etc. FEDs utilize the well-established cathode-anode-phosphor technology in combination with dot matrix cellular construction of each pixel. VFDs also utilize cathode-anode-phosphor technology; electrons are emitted from a filament, and controlled by a grid electrode and an anode electrode to collide with phosphor material on the anode to excite the phosphor material. Generally, a CRT (cathode ray tube) produces various color images by mixing red, green and blue lights emitted from red, green and blue phosphors, respectively. It is difficult for VFDs or FEDs to radiate various colors by mixing the red, green and blue lights because the VFDs or FEDs generally use only one color phosphor. Therefore, there are ever-increasing demands for various color phosphors fulfilling various physical properties for low-voltage driven display devices. There is a special need for a phosphor emitting a pink ray in display devices alarming an emergency situation.

SUMMARY OF THE INVENTION

It is an object of the present invention to provide a low-voltage excited pink phosphor having good color purity.

It is another object of the present invention to provide a low-voltage excited pink phosphor with high brightness and excellent color maintenance.

In order to achieve these and other objects, the present invention provides a low-voltage excited pink phosphor including a ZnS:Zn or ZnS:Ag phosphor; and a $(Zn_nCd_{1-n})S:Ag,Cl$ phosphor (n=0.1 to 0.5).

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION OF THE INVENTION

Figure 1:
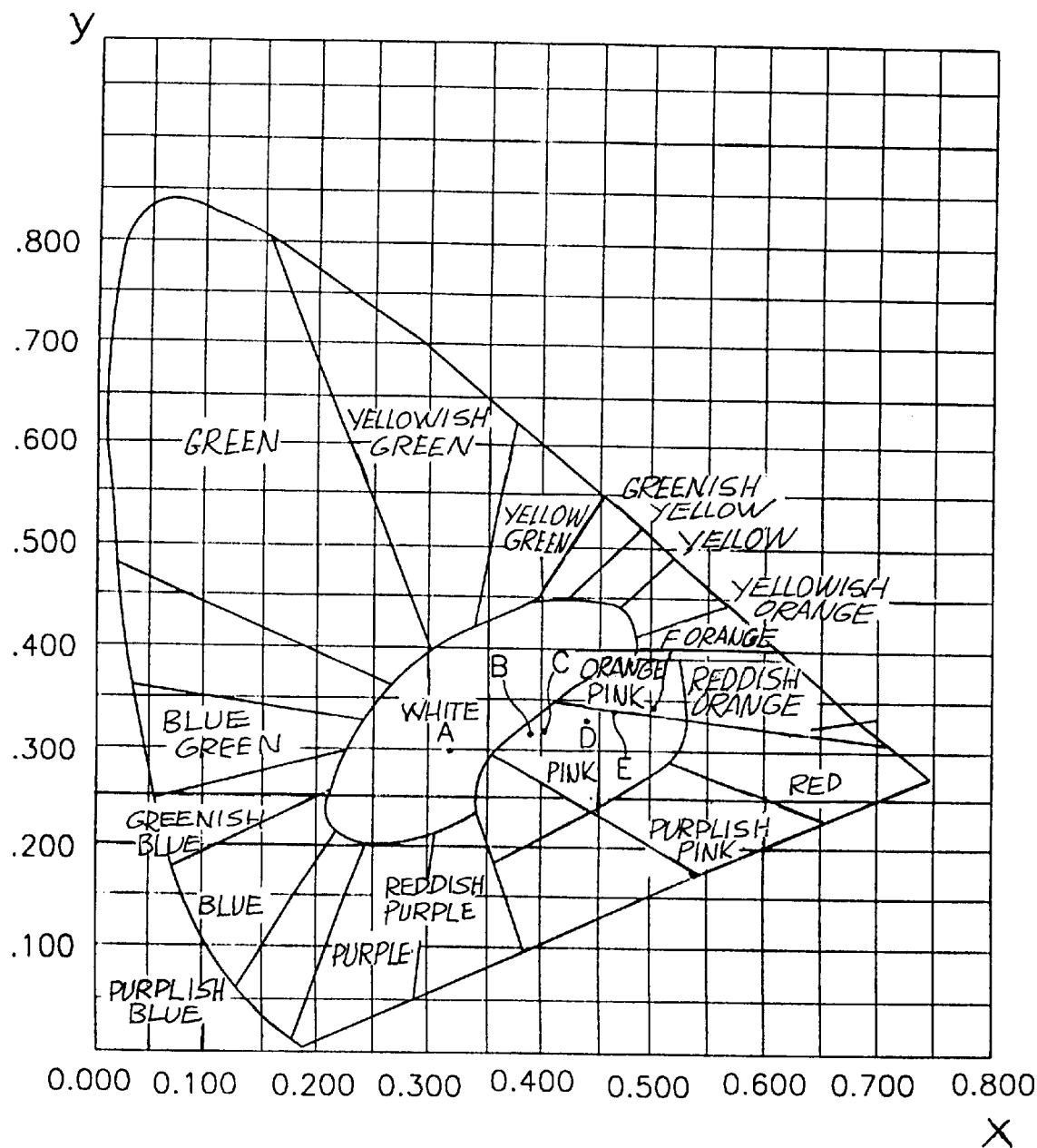
FIG. 1 is a CIE chromaticity diagram of pink phosphors according to embodiments of the present invention.

For a better understanding of the present invention, reference will now be made in detail to the following disclosures.

The pink phosphor according to an embodiment of the present invention includes a ZnS:Zn or ZnS:Ag phosphor and a $(Zn_nCd_{1-n})S:Ag,Cl$ phosphor (n=0.1 to 0.5). The pink phosphor is produced by mixing a blue phosphor with a reddish orange or red phosphor, and uses a ZnS:Zn or ZnS:Ag phosphor as the blue phosphor and a (ZnCd)S:Ag,Cl phosphor as the red phosphor.

The color of the (ZnCd)S:Ag,Cl phosphor depends on the composition of Zn and Cd. For obtaining the pink phosphor of the present invention, the (ZnCd)S:Ag,Cl having 10–50 mol % of Zn and 90–50 mol % of Cd is preferably used. Namely, the phosphor is expressed by the formula $(Zn_nCd_{1-n})S:Ag,Cl$, where n is in the range of 0.1 to 0.5. If n is not within this range, the resulting phosphor emits a different color from the intended pink color.

By mixing the ZnS:Zn or ZnS:Ag blue phosphor and the $(Zn_nCd_{1-n})S:Ag,Cl$ red phosphor (n=0.1 to 0.5), the resulting phosphor emits a pink color in a CIE chromaticity diagram. The wavelength spectrum of the resulting phosphor actually shows two peaks of a blue and a red wavelength, but a user cannot differentiate the separate colors but rather sees only the mixed pink color.

The ZnS:Zn and ZnS:Ag phosphors have good light emitting efficiency and high brightness. The (ZnCd)S:Ag,Cl phosphor has good conductivity and low threshold voltage, but has a drawback in that brightness saturation phenomena frequently occur on the phosphor. Therefore, the pink phosphor, produced by properly mixing the two phosphors has high brightness and good light emitting efficiency, and emits a visible ray with relatively low driving voltage and without brightness saturation. In the present invention, the mixing ratio of the ZnS:Zn or ZnS:Ag phosphor: the $(Zn_nCd_{1-n})S:Ag,Cl$ phosphor (n=0.1 to 0.5) is 20:80 to 80:20 in weight, and more preferably 50:50. If the ratio of the ZnS:Zn or ZnS:Ag phosphor/$(Zn_nCd_{1-n})S:Ag,Cl$ phosphor (n=0.1 to 0.5) is greater than 8/2, the color of the resulting phosphor shifts to a blue color; while if the ratio of the ZnS:Zn or ZnS:Ag phosphor/the $(Zn_nCd_{1-n})S:Ag,Cl$ phosphor (n=0.1 to 0.5) is less than 2/8, the color of the resulting phosphor shifts to a red color.

The pink phosphor of the present invention may further include metal additives to increase its luminous efficiency, brightness and color maintenance. The preferable metal additive includes Zn, and Zn is added to the phosphor in the form of minuscule particles having diameters of 0.1 to 100 micrometers. Preferably, a Zn particle has a diameter of 0.1–10 μm and at least 95% purity.

The added Zn increases the luminous efficiency of the (ZnCd)S:Ag,Cl phosphor, thereby increasing the peak intensity corresponding to the red wavelength, changing the color of the phosphor from blue to red, and increasing the brightness of the phosphor.

The preferred amount of Zn is from 0.1 to 5.0 wt % based on the pink phosphor. If the amount of Zn is less than 0.1 wt %, the brightness of the pink phosphor does not increase, whereas if the amount of Zn is above 5.0 wt %, no additional advantage is realized.

The Zn particles in the phosphor react with oxygen during a baking step when producing the VFD, thereby oxidization of a host material in the phosphor can be prevented. Furthermore, Zn is diffused on a surface of the phosphor, lowering the surface charge of the phosphor such that the incidence efficiency of hot electrons is enhanced. Accordingly, the brightness of the phosphor increases by 20 to 100% according to the amount of metal added to the phosphor compared with the brightness of a pink phosphor having no metal additives.

The brightness of a conventional phosphor decreases as its surface temperature is raised. However, the pink phosphor including a metal additive has excellent heat resistance characteristics, and its brightness is minimally decreased with a temperature increase.

The other advantage of the pink phosphor is its color maintenance. Because the lifetimes of phosphor materials generally differ from each other, the color of a phosphor including two or more phosphors gradually changes with use. In contrast, in the pink phosphor of the present invention, each phosphor component has a similar lifetime; thereby the pink phosphor maintains its color during its full lifetime. The pink phosphor including a metal additive has more preferred color maintenance. The pink phosphor of the present invention has CIE color coordinates of x=0.30 to 0.55 and y=0.2 to 0.40.

The present invention is further explained in more detail with reference to the following examples. However, the present invention is not confined to the following examples.

EXAMPLE 1

50 wt % of ZnS:Zn phosphor was mixed with 50 wt % of $(Zn_{0.22}Cd_{0.78})S:Ag,Cl$ phosphor to produce a pink phosphor.

EXAMPLE 2

50 wt % of ZnS:Zn phosphor and Zn additive were mixed with 50 wt % of $(Zn_{0.22}Cd_{0.78})S:Ag,Cl$ phosphor to produce a pink phosphor. The amount of the Zn was 0.4 wt % of the mixture.

EXAMPLE 3

40 wt % of ZnS:Zn phosphor was mixed with 60 wt % of $(Zn_{0.22}Cd_{0.78})S:Ag,Cl$ phosphor to produce a pink phosphor.

EXAMPLE 4

40 wt % of ZnS:Zn phosphor and Zn additive were mixed with 60 wt % of $(Zn_{0.22}Cd_{0.78})S:Ag,Cl$ phosphor to produce a pink phosphor. The amount of the Zn was 0.4 wt % of the mixture.

EXAMPLE 5

30 wt % of ZnS:Zn phosphor was mixed with 70 wt % of $(Zn_{0.22}Cd_{0.78})S:Ag,Cl$ phosphor to produce a pink phosphor.

EXAMPLE 6

30 wt % of ZnS:Zn phosphor and Zn additive were mixed with 70 wt % of $(Zn_{0.22}Cd_{0.78})S:Ag,Cl$ phosphor to produce a pink phosphor. The amount of the Zn was 0.4 wt % of the mixture.

Six VFDs were manufactured with the pink phosphors of Examples 1–6. While driving each VFD with a grid and anode voltage Ebc of 21 Vp-p and a duty ratio of 1/7, the brightness, luminous efficiency, color coordinates, and heat resistance property were measured. The results are shown in Table 1. In Table 1, ft-L is a unit of brightness and indicates foot-lambert. The luminous efficiency indicates brightness per watt. Generally, the brightness decreases as the temperature increases, and the heat resistance in Table 1 represents the brightnesses of the phosphors at high temperature (85° C.) compared with the brightness of the phosphors at room temperature (25° C.).

TABLE 1

|  | Brightness [ft-L] | Luminous efficiency [Lm/w] | Color coordinates (x) × (y) | Brightness Percentage to green phosphor | Heat resistance at 85° C. [%] |
| --- | --- | --- | --- | --- | --- |
| Example 1 | 20.2 | 0.99 | 0.320 × 0.297 | 6.3 | 47.0 |
| Example 2 | 31.1 | 1.48 | 0.398 × 0.320 | 9.7 | 68.4 |
| Example 3 | 16.6 | 0.89 | 0.380 × 0.314 | 5.2 | 47.2 |
| Example 4 | 31.0 | 1.52 | 0.466 × 0.341 | 9.6 | 74.1 |
| Example 5 | 17.8 | 0.92 | 0.429 × 0.330 | 5.5 | 49.7 |
| Example 6 | 31.7 | 1.58 | 0.504 × 0.343 | 9.9 | 73.4 |

As shown in Table 1, most phosphors of Examples 1–6 emit a pink color in a CIE chromaticity diagram, and the colors of the phosphors of Examples 1–6 shift to red color as the amount of the red phosphor increases. In FIG. 1, A indicates the CIE chromaticity coordinate of the phosphor of Example 1, and C, B, D, E and F indicate the CIE chromaticity coordinates of the phosphors of Example 2, 3, 4, 5 and 6, respectively. As shown in FIG. 1, C has a color coordinate which is closest to the color pink, and A has a color coordinate of the color white, but the user generally perceives the color as pink.

As shown in Table 1, the pink phosphors including Zn (Examples 2, 4 and 6) have improved brightness and heat resistance compared with the pink phosphors without Zn (Examples 1, 3 and 5). Therefore, by adding Zn to the phosphors, reduction of the brightness of the phosphors at high temperature is minimized.

Figure 2:
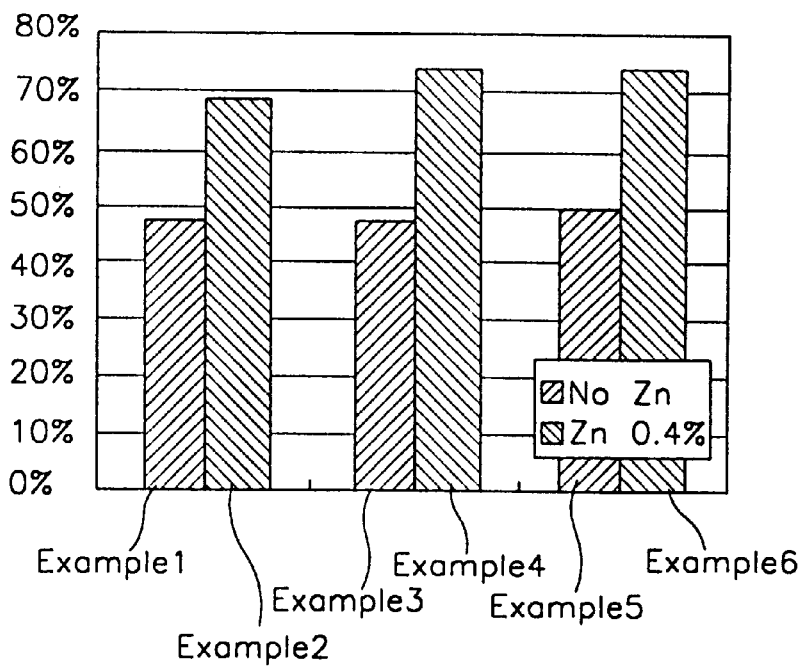
FIG. 2 is a bar graph showing the heat resistances of pink phosphors according to embodiments of the present invention.
Figure 3:
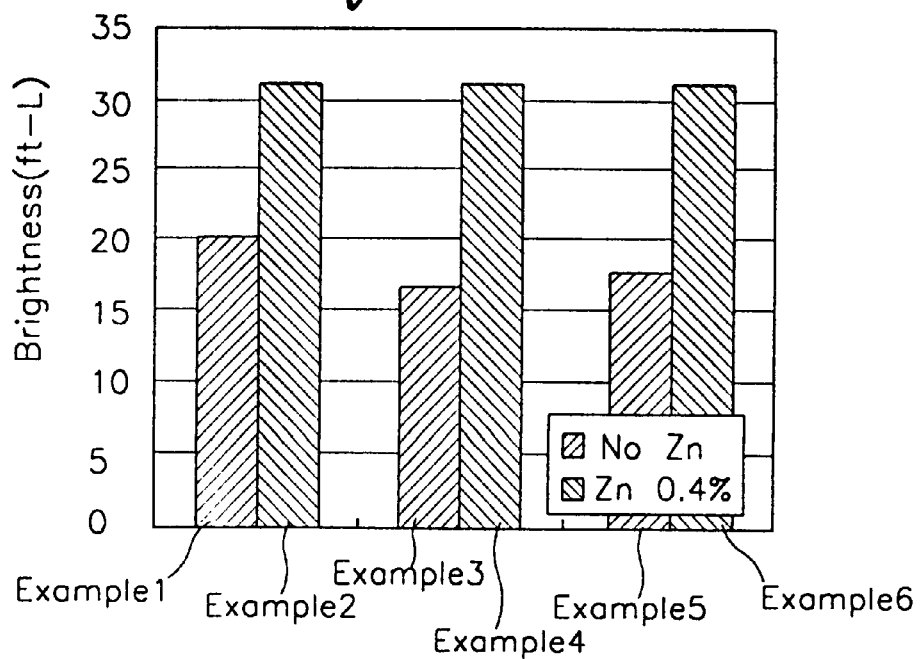
FIG. 3 is a graph showing brightness of pink phosphors according to embodiments of the present invention.
Figure 4:
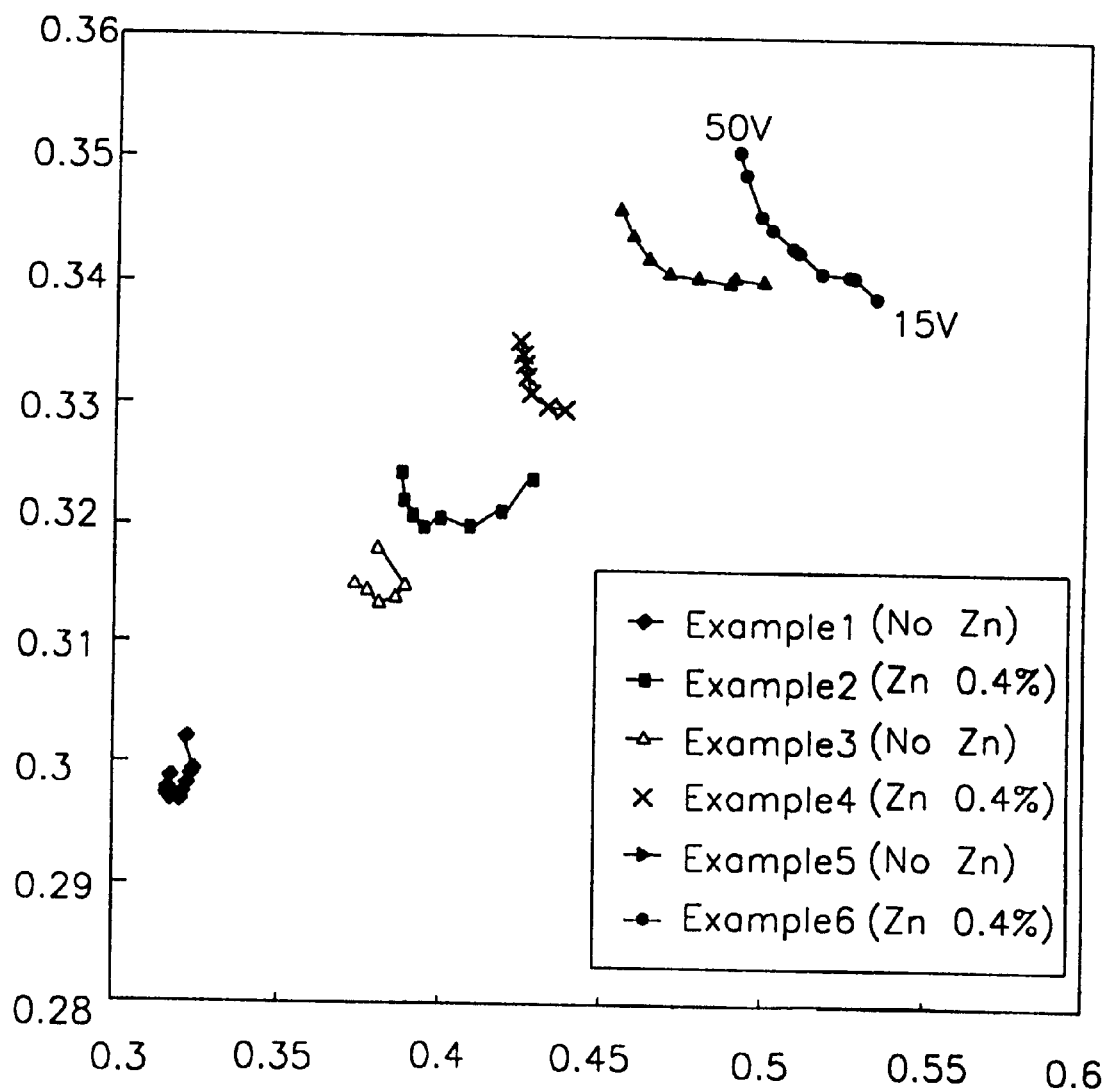
FIG. 4 is a color coordinate diagram of pink phosphors according to embodiments of the present invention.

FIGS. 2 and 3 are graphs showing the heat resistances and brightnesses of the phosphors of Examples 1–6. As shown in FIGS. 2 and 3, the heat resistance and the brightness are greatly improved by adding Zn. FIG. 4 shows shifts in the CIE chromaticity coordinates of the pink phosphors of Examples 1–6 when changing Ebc from 15V to 50V. As shown in FIG. 4, when Zn is added to the phosphors, the brightnesses of the red phosphors increase, and the CIE chromaticity coordinates of the phosphors shift to a red color compared with the phosphors without Zn.

Figure 5:
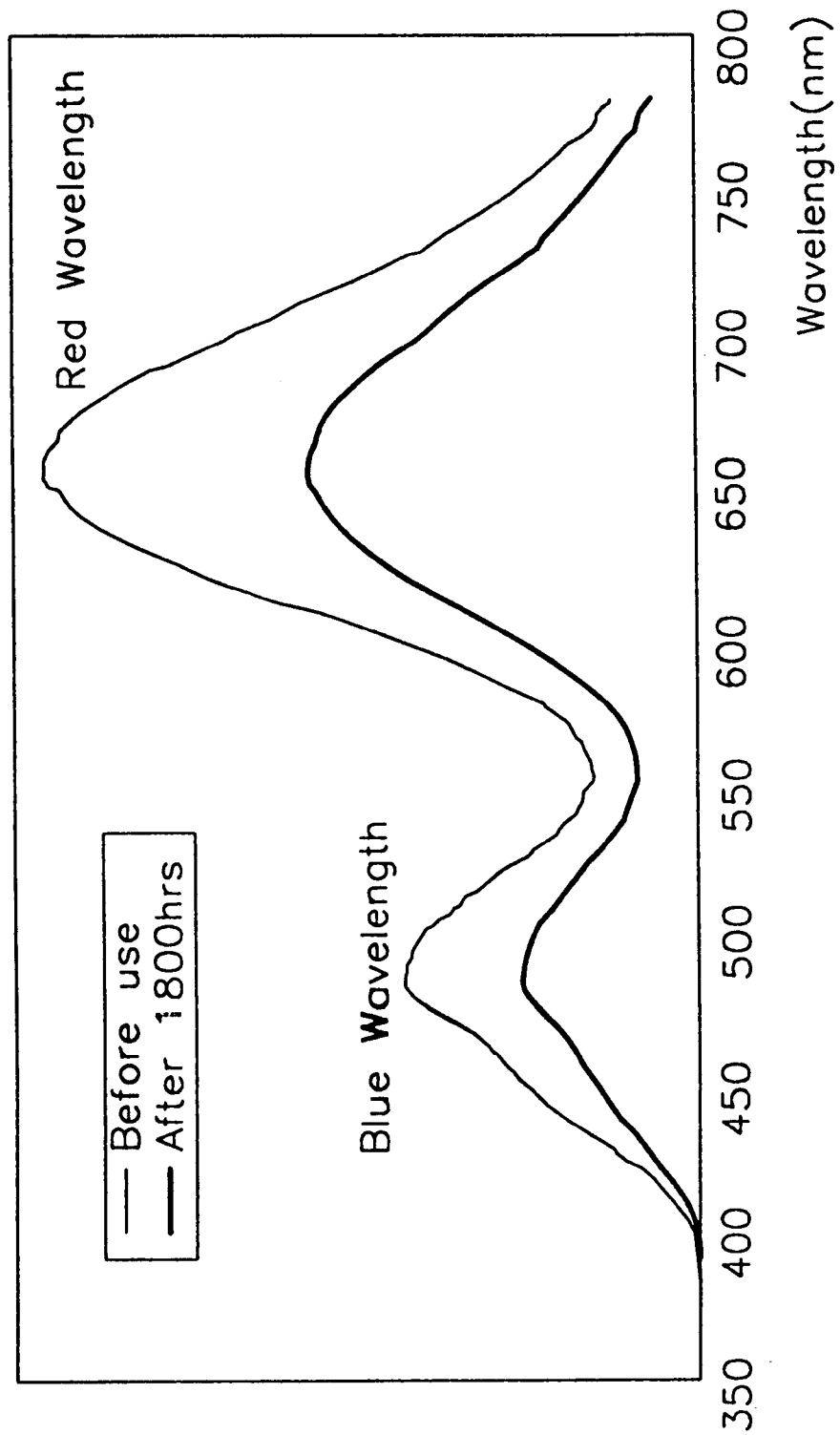
FIG. 5 is a graph showing wavelength spectrums of a pink phosphor according to an embodiment of the present invention.

A VFD was manufactured with the pink phosphor of Example 2, and wavelength spectrums of its pink color rays before and after driving 1000 hours were measured. The results are shown in FIG. 5. As shown in FIG. 5, the pink phosphor of the present invention has two peaks of a blue and a red wavelength, and the color quality of the resulting pink color ray depends on the difference between heights (intensities) of the blue and the red peaks. If the blue peak is higher than the red peak, a light pink color results, while if the red peak is higher than the blue peak, a dark pink color results. If the lifetime of the blue phosphor is different from that of the red phosphor, the quality of the pink color ray changes since the difference between the heights of the two peaks changes with the driving of the VFD. However, as shown in FIG. 5, the height difference between the blue and the red peaks for the pink phosphor of the present invention remains constant before and after use. This indicates that the quality of the pink color is maintained during the entire lifetime of the pink phosphor, because the blue and the red phosphors have the same lifetimes.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A low-voltage excited pink phosphor comprising:
    a ZnS:Zn or ZnS:Ag phosphor; and
    a $(Zn_nCd_{1-n})S:Ag,Cl$ phosphor, wherein n ranges from 0.1 to 0.5.

2. The low-voltage excited pink phosphor of claim 1 wherein the weight ratio of the ZnS:Zn or ZnS:Ag phosphor: the $(Zn_nCd_{1-n})S:Ag,Cl$ phosphor is 20:80 to 80:20.

3. The low-voltage excited pink phosphor of claim 1 further comprising a Zn additive.

4. The low-voltage excited pink phosphor of claim 3 wherein the amount of Zn additive is from 0.1 to 5.0 wt % of the pink phosphor.

5. The low-voltage excited pink phosphor of claim 3 wherein the Zn additive includes Zn particles having diameters of 0.1 to 10 $\mu$m and at least 95% purity.

6. The low-voltage excited pink phosphor of claim 1 wherein the pink phosphor has a color coordinate of x=0.30 to 0.55 and y=0.20 to 0.40 in a CIE chromaticity diagram.

7. The low-voltage excited pink phosphor of claim 3 wherein the Zn additive comprises Zn particles having diameters of 0.1 to 100 micrometers.

* * * * *